United States Patent [19]

Schmidt

[11] 3,986,350

[45] Oct. 19, 1976

[54] METHOD OF AND APPARATUS FOR IMPROVED METHANOL OPERATION OF COMBUSTION SYSTEMS

[76] Inventor: Reinhold Schmidt, Sachsenstrasse 7, Erlangen, Germany

[22] Filed: Feb. 21, 1975

[21] Appl. No.: 551,841

[30] Foreign Application Priority Data

Mar. 6, 1974 Germany............................ 2410644

[52] U.S. Cl. ................................ 60/274; 60/276; 60/301; 60/39.02; 60/39.46 R; 60/39.5; 123/3

[51] Int. Cl.² ...................... F01N 3/15; F02G 3/00; F02B 75/10

[58] Field of Search............... 60/301, 39.46, 39.02, 60/276, 274, 39.5; 123/3

[56] References Cited
UNITED STATES PATENTS

| | | | |
|---|---|---|---|
| 2,010,427 | 8/1935 | Eversole | 252/459 X |
| 2,773,561 | 12/1956 | Honter | 423/248 X |
| 3,000,707 | 9/1961 | Barstow | 60/301 X |
| 3,118,727 | 1/1964 | Cohn | 60/301 |
| 3,167,913 | 2/1965 | Muhlberg et al. | 60/39.02 |
| 3,434,281 | 3/1969 | Donaldson | 60/39.53 X |
| 3,518,975 | 7/1970 | Schmidt | 123/8.49 |
| 3,745,768 | 7/1973 | Zechnall et al. | 60/276 |
| 3,768,259 | 10/1973 | Larnahan et al. | 60/285 X |

Primary Examiner—Carlton R. Croyle
Assistant Examiner—Thomas I. Ross
Attorney, Agent, or Firm—Michael J. Striker

[57] ABSTRACT

A method of and apparatus for cracking methanol, for utilizing the cracked-methanol to operate a minimum-pollution fuel-combusting device. The heat of combustion gases which is brought into the presence of a catalyst is employed to crack the methanol into hydrogen gas and carbon monoxide gas. The hydrogen gas and carbon monoxide gas thereupon serve as the primary fuel source for the fuel-combusting device and these gases, or hydrogen alone, are further utilized to create a reduction atmosphere so as to render the heated combustion gases inert and pollution-free to discharge into the ambient atmosphere.

4 Claims, 3 Drawing Figures

METHOD OF AND APPARATUS FOR IMPROVED METHANOL OPERATION OF COMBUSTION SYSTEMS

BACKGROUND OF THE INVENTION

The present invention relates to a method of and apparatus for utilizing the heat of the combustion gases produced by operation of a fuel-combusting device to crack methanol into its constituent parts, namely, hydrogen and carbon monoxide. The hydrogen gas and carbon monoxide gas are thereupon employed to serve as the fuel to power the fuel-combusting device and to create a reduction atmosphere to render the heated combustion gases inert and pollution-free prior to discharge into the atmosphere.

The present invention relates more particularly to fuel combusting devices such as vehicle combustion engines, power stations, burners and boilers which require efficient fuel consumption and pollution-free exhaust gases.

In the prior art, methanol operation for combustion engines is well known. However, direct methanol operation is not yet a reasonable substitute as compared with the operation by oil-based fuels, since methanol is not available today in sufficient quantity. Upon combustion, methanol alone is inefficient because of its low thermal capacity, so that without further improvements it cannot be used to power modern high-compression engines. Accordingly, resort is had to the higher thermal energy oil-based fuels, such as gasoline, with the resulting disadvantage of discharging pollutants in the exhaust gases to the outside atmosphere.

The search for additional sources of energy will be aided by the present invention. Since methanol can be produced by, for instance, th destructive distillation of wood or the synthesis of coal gas, it serves as a convenient alternative to oil-based fuels. However, as yet the prior art does not employ methanol as a source of energy because of its inherent low calorie power potential.

SUMMARY OF THE INVENTION

Accordingly, it is the general object of the present invention to overcome the disadvantages of the prior art.

More particularly, it is an object of the present invention to provide an improved apparatus for and method of improving the efficiency of methanol-based fuel sytems.

Another object of the present invention is to utilize by low temperature the heat of the combustion gases produced by a fuel-combusting device to crack the methanol in the presence of a catalyst into its constituent parts, hydrogen and carbon monoxide, so as to use these gases as the primary fuel source.

A further object of the present invention is to utilize a portion of the hydrogen and carbon monoxide mixture, or the hydrogen gas alone, produced from the cracked methanol to create a reduction atmosphere so as to render the exhaust combustion gases inert and pollution-free.

In keeping with these objects and others which will become apparent hereinafter, the method according to the present invention mainly comprises the steps of conveying the methanol to a section of a heat exchanger which accommodates a catalyst, conveying the heated combustion gases derived from a fuel-combusting device to an other section of the heat exchanger, exchanging heat between the two sections thereby cracking the methanol into its constituent parts of hydrogen and carbon monoxide gases, and conveying these gases to the fuel-combusting device as the main fuel-source.

By using the hydrogen gas and carbon monoxide as the main fuel-source, instead of using the methanol directly as taught by the prior art, a highly efficient operation is achieved. Hydrogen, in particular, has a very high thermal capacity; it serves ideally as an efficient source of energy in combustion systems. Moreover, when hydrogen combusts, it combines with the oxygen in the atmosphere to form water, a non-noxious byproduct.

These novel features of the present invention therefore overcome all of the disadvantages of the prior art. No longer is methanol operation restricted to low yielding power outputs. The use of the heat of the combustion gases itself provides a convenient and inexpensive method for cracking the Methanol. Methanol operation is thus vastly improved; with a thermal energy potential of about 95o Kcal/kg, it is now more commercially reasonable for use in automobiles, power stations and heating systems.

According to a further feature of the invention, a portion of the hydrogen gas may be tapped off the main fuel feed conduit by means of a valve cooperating with a hydrogen permeable membrane so as to create a reduction atmosphere for the combustion gases to pass through. With the aid of a catalytic converter, the nitrogen oxides byproducts may be chemically reduced in a hydrogen-created atmosphere so as to produce inert nitrogen gas and carbon dioxide gas for eventual discharge into the outside atmosphere. This novel feature of the present invention, consequently, aids in the environmental concern for pollution-free air.

The catalytic converter used in the hydrogen-reduction atmosphere is, as disclosed in the 1973 foreign German publication entitled "KATALYSATOREN ZUR REINIGUNG VON AUTOABGASEN," Weigert, Koberstein, and Lakatos, and published in CHEMIKER-Zeitung, 97, Jahrgang, Nr. 9, known in the prior art. The catalytic converter should be preferably selected from the group of noble or precious metals, such as platinum or palladium, or it can be selected from the group of non-precious metals.

The catalyst used for the cracking of methanol is also known in the prior art and is fully disclosed by U.S. Pat. No. 2,010,427. The catalyst is preferably composed of reduced copper and nickel supported on an inert carrier, the ratio of copper to nickel is preferably from about 2.5 : 1.0 to about 4.0 : 1.0.

The hydrogen-permeable membrane which allows only hydrogen to pass through to create the reduction atmosphere is also known to the prior art and is fully disclosed in U.S. Pat. No. 2,773,561. It may be a chemical composition, as for example, one on the basis of palladium or silver-palladium; or, alternatively, it may be constructed of mechanical means by a steel membrane operating by diffusion means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
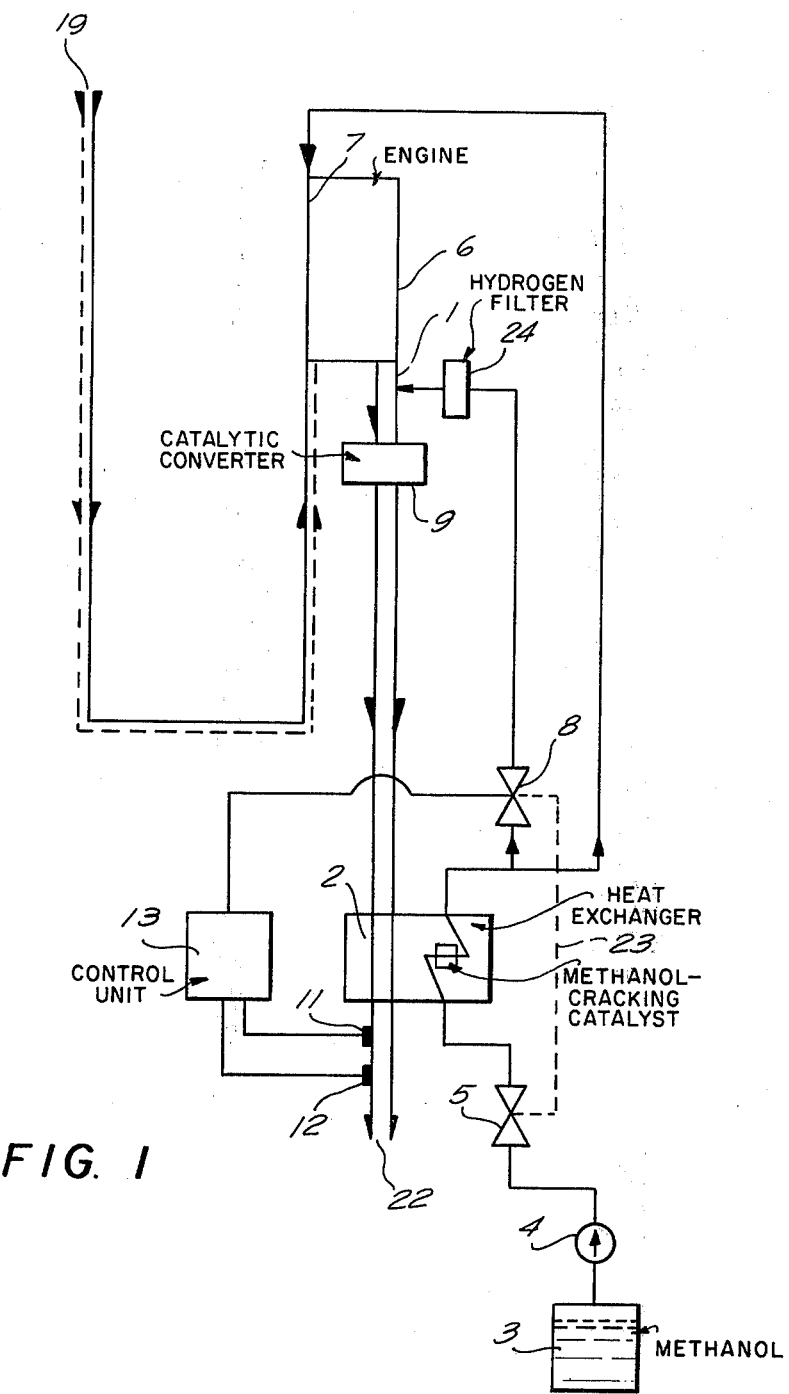
FIG. 1 is a diagrammatic view of an apparatus according to the present invention.

Discussing the apparatus which has been illustrated in an exemplary embodiment of FIG. 1, it will be seen that a methanol fuel supply is stored in a tank 3 and circulated by a pump 4 through conduit means to a first section of a heat exchanger 2. An inlet valve 5 is located in the conduit means to control the methanol flow. The first section of the heat exchanger accommodates a catalyst whose presence makes the cracking of methanol feasible. This catalyst is preferably composed of reduced copper and nickel in a ratio from about 2.5 : 1 to about 4.0 : 1 and supported on an inert carrier as fully disclosed in U.S. Pat. No. 2,010,427.

After the methanol has been cracked into its constituent parts, hydrogen gas and carbon monoxide, the cracked-methanol is conveyed via the fuel feed system 7 to a fuel-combusting device 6 where it joins with air supplied from the air supply vent 19 to support combustion in the fuel-combusting device 6. The hydrogen gas and carbon monoxide serve as the primary fuel to power the fuel-combusting device 6, thereby producing heated combustion gases of carbon dioxide, unburnt carbon monoxide, nitric oxides, nitrogen, unburnt hydrogen and steam or water exhausted to the catalytic converter 9 through the exhaust outlet 1.

A second bypass conduit taps off the main fuel feed sytem 7 and conveys a portion of the hydrogen gas constituent of the cracked-methanol to the exhaust outlet 1 by means of a regulator valve 8 and a hydrogen-permeable membrane 24. The hydrogen permeable membrane 24, which can be chemically composed of palladium or silver-palladium as disclosed in U.S. Pat. No. 2,773,561, or alternatively constructed of a steel membrane operating by means of diffusion, effectively bars the entry of the carbon monoxide constituent of the cracked-methanol and only allows hydrogen gas to enter the exhaust outlet 1, so as to create a reduction atmosphere inside the catalytic converter 9. The principle also functions without using the membrane 24.

The catalytic converter 9 cooperating with the presence of the hydrogen and carbon monoxide mixture or a hydrogen atmosphere alone reduces the nitric oxides to heated inert gases by accommodating a catalyst therein which is known to the prior art as disclosed in the 1973 foreign German publication entitled "KATALYSATOREN ZUR REINIGUNG VON AUTOABGASEN", Weigert, Koberstein, and Lakatos, and published in CHEMIKER-ZEITUNG, 97, Jahrgang, Nr. 9, and is preferably a metal selected from the group of noble or precious metals such as platinum or palladium, or selected from the group of non-precious metals.

The heated inert gases are thereupon conveyed to a second section of the heat exchange 2, so that an exchanger of heat will occur with the first section to make cracking possible; and thereupon, the inert gases are discharged to the outside atmosphere via the exhaust conduit 22. The cracking process is well known in the art and takes place at a cracking temperature from about 260° to about 345° C. The cracking process is more than 97% efficient, and can be best summarized by the chemical equation:

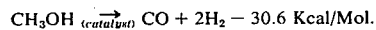

$$CH_3OH \xrightarrow{(catalyst)} CO + 2H_2 - 30.6 \text{ Kcal/Mol}.$$

A sensing element 11 to detect the presence of carbon monoxide and a sensing element 12 to detect the presence of nitric oxides is located downstream of the flow of the inert gases. Both sensing elements cooperate with a controller 13 which in turn cooperates with the regulator valve 8, and then in turn with the inlet valve 5 along the line of application 23. If carbon monoxide and/or nitric oxides are detected prior to discharge to the outside atmosphere, the regulator valve 8 will open to allow an increased flow of cracked-methanol to flow towards the hydrogen-permeable membrane 24, so as to increase the effectiveness of the hydrogen-reduction atmosphere by increasing the quantity of hydrogen. The principle also functions without using the membrane 24. In addition, the inlet valve 5 will be concurrently opened to increase the flow of methanol, so that additional cracking occurs. Sensing elements 11 and 12 are entirely conventional and are believed not to require any detailed discussion. For example, sensing element 11 may be constituted by an analyzer known commercially as a "Model 315a Beckman Infrared Analyzer"; and sensing element 12 may be constituted by an analyzer known commercially as "Dynasciences Corporation Model NX 130 Air Pollution Monitor."

Figure 2:
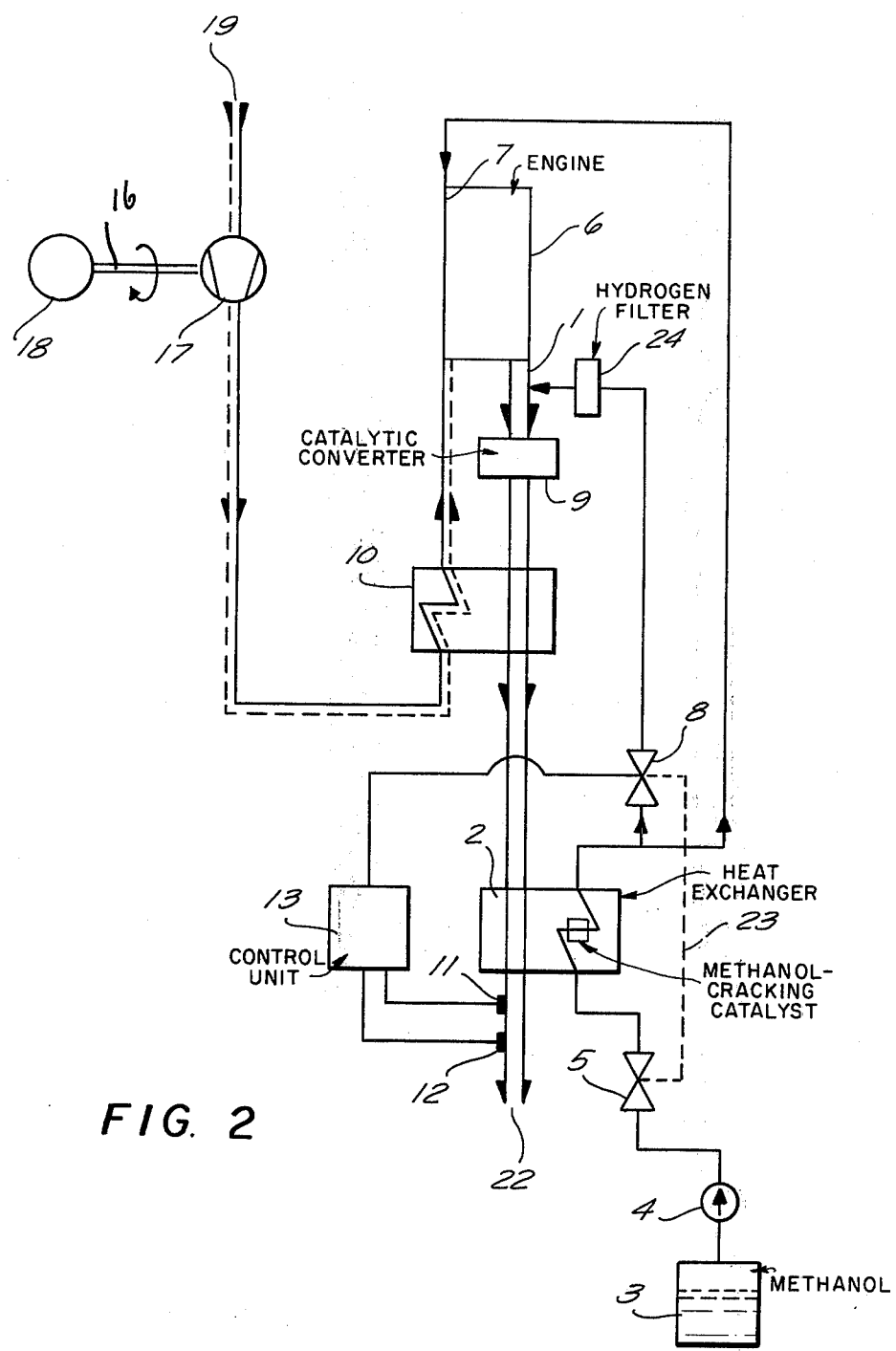
FIG. 2 is a diagrammatic view of a preferred embodiment of an apparatus according to the present invention.

In FIG. 2, a preferred embodiment of the features illustrated. In addition to having all of the features mentioned above for the exemplary embodiment of FIG. 1, it has the following additional features. Reference numeral 10 is a heater unit having at least two sections, each of which is in heat exchanging relationship with the other. Reference numeral 17 is a compressor which is powered by the motor-generator 18 along a common shaft 16. Air enters through the air supply vent 19 into the compressor 17 to be compressed, and thereupon is conveyed to one of the sections of the heater unit 10. The other section of the heater unit surrounds a path for the heated combustion gases to pass through, thus allowing a heat exchange with the first section. The compressed and heated air may be injected into the fuel-combusting device 6 along with the cracked-methanol so as to increase the efficiency of the combustion process. In all other respects, the operation is the same as previously described for the apparatus as described for FIG. 1.

Figure 3:
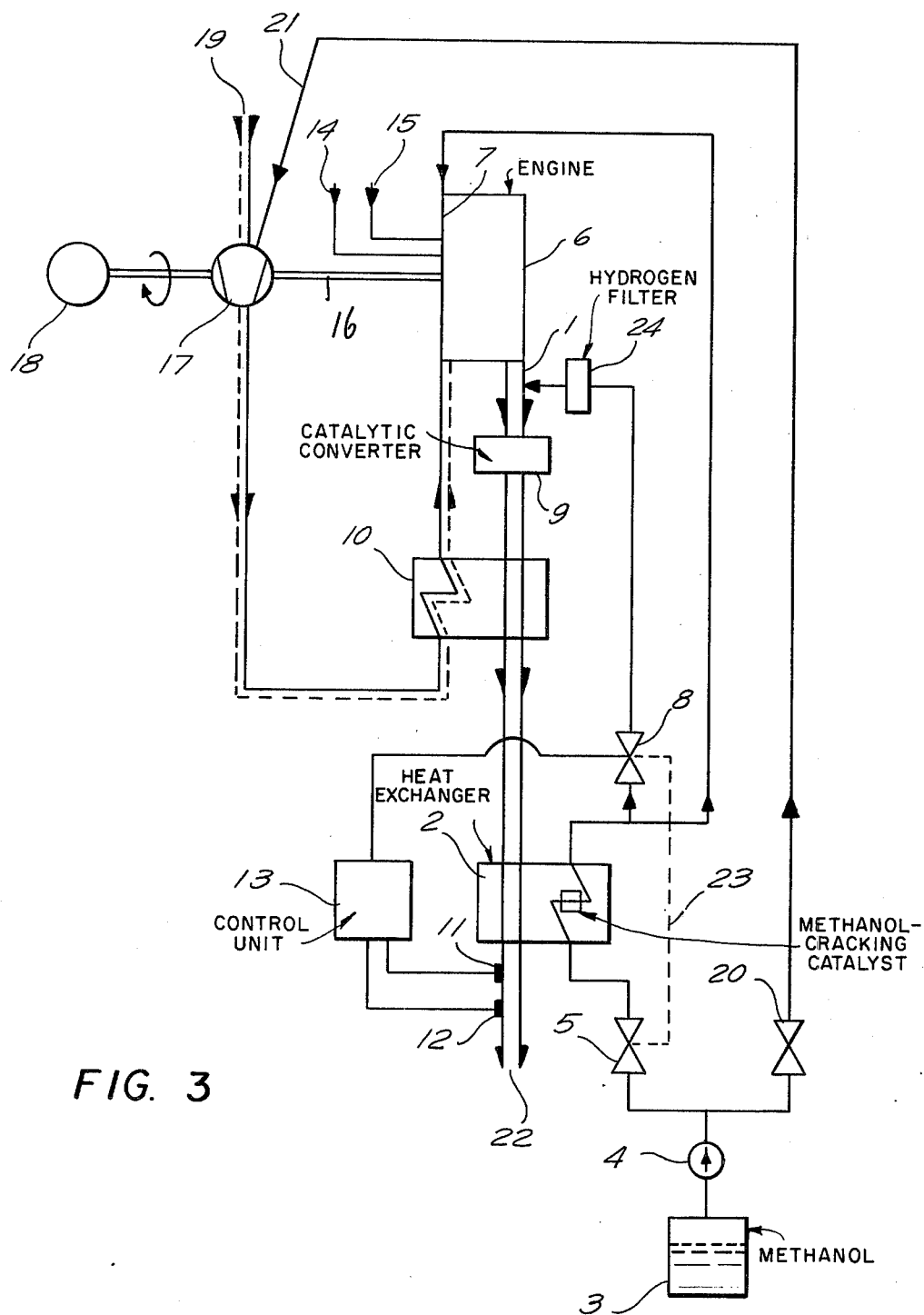
FIG. 3 is a diagrammatic view of another preferred embodiment of an apparatus according to the present invention.

In FIG. 3, a further preferred embodiment has been illustrated. In addition to having all the features mentioned above for the embodiments of FIG. 1 and FIG. 2, it has the following additional features. Reference numeral 6 is generically a fuel-combusting device, but more specifically a rotary piston engine of the screw type as more fully described in U.S. Pat. No. 3,518,975. Under all loading conditions of the rotary piston engine 6, the primary fuel feed system 7 is feeding hydrogen and carbon monoxide into the engine chamber. However, for medium or higher loading conditions additional fuel is required to be supplied in a controlled manner so as to insure an isothermal combustion during the expansion cycle of the engine so that the thermodynamically advantageous Ericsson process can be thus closely approached and efficiencies substantially in excess of 40% can be obtained.

Accordingly, a secondary fuel feed system 21 conducts methanol from the tank 3 by means of the pump 4 to a valve 20 and thereupon to a compressor 17 which is operative by means of a motor-generator 18 along a comon shaft 16. An air supply vent 19 mixes incoming air with the methanol. Thereupon, the compressed air-methanol mixture is conducted by means of conduits to one section of a heater unit 10. The heater unit 10 has at least two sections in heat-exchanging relationship with each other; the second section accommodating a path for the heated combustion gases to pass through, thus allowing a heat exchange with the first section. The compressed and heated mixture of air and methanol is a combustible secondary fuel which may be squirted or injected or sprayed at appropriate time intervals in order to increase the efficiency of the rotary engine 6 by allowing isothermal combustion for a nitric oxides minimum and to take place at less tha 1500° C. Ignition device 14 ignites the hydrogen and carbon monoxide gas and/or the compressed and heated air-methanol mixture depending upon the loading conditions. A cooling medium supply 15 cools the rotary-engine 6 and conducts excess heat away. A common shaft 16 for the motor-generator 18, the compressor 17, and the rotary-engine 6 may be advantageously employed.

It will be understood that each of the elements described above, or two or more together, may also find a useful application in other types of constructions differing from the types described above. Specifically, the fuel-combusting device 6 may be a Stirling motor, or a gas turbine, or any internal or external combustion engines of the reciprocating-piston or rotary-piston type, or any burner device, or any boiler device.

While the invention has been illustrated and described as embodied in the method of and apparatus for improved methanol operation of combustion systems, it is not intended to be limited to the details shown, since various modifications and structural changes may be made without departing in any way from the spirit of the present invention.

Without further analysis, the foregoing will so fully reveal the gist of the present invention, that others can be applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A method of improving the operation of a fuel-combustion system, particularly an internal combustion engine, comprising the steps of admitting a fuel and a combustion-supporting gas into a fuel-combusting device; discharging the resulting heated combustion gases from said device in a first path to one section of a heat-exchanger which has two sections in heat-exchanging relationship with each other, and thereupon towards the ambient atmosphere; providing a methanol-cracking catalyst in the other one of said heat-exchanging sections; conducting methanol from a supply in a second path towards said other section into the presence of said catalyst so as to crack the methanol into a resulting fuel mixture comprised of hydrogen and carbon monoxide by heat exchange with said heated combustion gases in said one section; feeding said fuel mixture from said catalyst in a third path towards said device; generating a reduction atmosphere in a first portion of said first path downstream of said device so as to reduce unwanted nitrogen-containing impurities in said heated combustion gases, said generating step including the steps of tapping off a portion of the fuel mixture in the third path, filtering substantially only the hydrogen constituent of the mixture, and conducting the hydrogen constituent into the presence of a catalytic substance which is operative for rendering the undesirable nitrogen-containing impurities inert in the presence of hydrogen; detecting amounts of carbon monoxide and nitrogen-containing impurities in a second portion of said first path which is downstream of said first portion prior to discharge into the ambient atmosphere; and limiting the amount of impurities in said heated combustion gases to a predetermined value in dependence upon the detected amounts of the carbon monoxide and nitrogen-containing impurities found in the heated combustion gases by controlling the amount of methanol flowing through a flow regulator which is provided in the second path intermediate the supply of methanol and the methanol-cracking catalyst and by simultaneously controlling the amount of hydrogen flowing through another flow regulator which is provided intermediate the methanol-cracking catalyst and the catalytic substance.

2. In a fuel-combustion system, particularly in an internal combustion engine, a combination comprising: a fuel-combusting device having inlet means for admitting a fuel and a combustion-supporting gas, and outlet means operative for discharge of the resulting heated combustion gases in a first path towards the ambient atmosphere; heat-exchanging means having two sections in heat-exchanging relationship with each other, one of said sections being located in said first path downstream of said outlet means; a methanol-cracking catalyst provided in the other one of said heat-exchanging sections; a supply of methanol; means for conducting said methanol in a second path towards said other section into the presence of said catalyst so as to crack the methanol into a resulting fuel mixture comprised of hydrogen and carbon monoxide by heat exchange with said heated combustion gases in said one section; means for feeding said fuel mixture in a third path from said catalyst towards said inlet means; means for generating a reduction atmosphere in a portion of said first path intermediate said outlet means and said one section so as to reduce unwanted nitrogen-containing impurities in said heated combustion gases, said generating means including a catalytic substance which renders nitrogen-containing impurities substantially inert in the presence of hydrogen, means for tapping off a portion of said fuel mixture flowing in said third path, and filtering means for thereafter permitting substantially only the hydrogen constituent of the fuel mixture to come into the presence of said catalytic substance; sensing means downstream of said generating means for detecting the amounts of carbon monoxide and nitrogen-containing impurities which are present in said first path prior to discharge into the ambient atmosphere; regulating means including a first flow-regulating valve in said second path intermediate said supply of methanol and said methanol-cracking catalyst, sand a second flow-regulating valve located intermediate said methanol-cracking catalyst and said catalytic substance; and control means for controlling the amount of impurities in said heated combustion gases to a predetermined value, said control means being simultaneously operative to control the amount of methanol flowing through said first valve and also the amount of hydrogen flowing through said second valve in dependence upon the detected amounts of carbon monoxide and nitrogen-containing impurities found in the heated combustion gases.

3. In the system as defined in claim 2; and further comprising means for compressing the combustion-supporting gas prior to admission via said inlet means into said fuel-combusting device; and means for preheating the compressed combustion-supporting gas prior to entry into said device, said preheating means comprising a heat-exchanger having two flow-through portions in heat-exchanging relationship with each other, one of said portions permitting said compressed gas to flow therethrough, and the other of said portions being located in said first path downstream of said outlet means so as to be heated by the heated combustion gases being discharged therefrom.

4. In the system as defined in claim 3; and further comprising auxiliary means for conducting additional amounts of methanol from said supply towards said compressing and preheating means so that said additional methanol is compressed and preheated prior to entry via said inlet means into said device.

* * * * *